US008019702B1

(12) United States Patent  (10) Patent No.: US 8,019,702 B1
Gargi et al.  (45) Date of Patent: Sep. 13, 2011

(54) SUPERVISED LEARNING WITH MULTI-SCALE TIME INTERVALS USING A STATISTICAL CLASSIFICATION MODEL TO CLASSIFY UNLABELED EVENTS

(75) Inventors: Ullas Gargi, San Jose, CA (US); Jay Yagnik, Mountain View, CA (US)

(73) Assignee: Google Inc., Mountain View, CA (US)

( * ) Notice: Subject to any disclaimer, the term of this patent is extended or adjusted under 35 U.S.C. 154(b) by 503 days.

(21) Appl. No.: 12/248,784

(22) Filed: Oct. 9, 2008

Related U.S. Application Data

(60) Provisional application No. 61/012,216, filed on Dec. 7, 2007.

(51) Int. Cl.
*G06F 11/00* (2006.01)
(52) U.S. Cl. ......................................................... 706/12
(58) Field of Classification Search .................... 706/20, 706/45–47, 62, 12; 702/57, 66, 75–77; 704/231, 704/232, 251
See application file for complete search history.

(56) References Cited

U.S. PATENT DOCUMENTS

| | | | |
|---|---|---|---|
| 2004/0231498 A1* | 11/2004 | Li et al. .......................... | 84/634 |
| 2005/0002561 A1* | 1/2005 | Monachino et al. .......... | 382/159 |
| 2005/0157926 A1* | 7/2005 | Moravec et al. .............. | 382/173 |
| 2007/0286499 A1* | 12/2007 | Freiburg et al. ............... | 382/229 |
| 2008/0109730 A1* | 5/2008 | Coffman et al. .............. | 715/733 |
| 2008/0126281 A1* | 5/2008 | Kisacanin et al. ............. | 706/20 |

OTHER PUBLICATIONS

Tao Li et al, *A Survey on Wavelet Applications in Data Mining*, SIGKDD Explorations, Dec. 2002, pp. 49-68, vol. 4, Issue 2.
*MCI-B: Installing and Getting Familiar with Scilab; II—A first step in multiscale analysis*, [online] retrieved from the internet on Oct. 16, 2007, pp. 1-17, Retrieved from the URL:<http://hmf.enseeiht.fr/travaux/CD0506/mci/reports/ibfs/html/p__multi.htm>.
Ulges, A., et al., "Identifying Relevant Frames in Weakly Labeled Videos for Training Concept Detectors," Conference on Image and Video Retrieval, Proceedings of the 2008 International conference on content-based image and video retrieval, 2008, pp. 9-16.

* cited by examiner

*Primary Examiner* — David R Vincent
(74) *Attorney, Agent, or Firm* — Fenwick & West LLP

(57) ABSTRACT

A method, a system and a computer program product generate a statistical classification model used by a computer system to determine a class associated with an unlabeled time series event.

24 Claims, 9 Drawing Sheets

SUPERVISED LEARNING WITH MULTI-SCALE TIME INTERVALS USING A STATISTICAL CLASSIFICATION MODEL TO CLASSIFY UNLABELED EVENTS

RELATED APPLICATIONS

This Application claims the benefit of Provisional Application No. 61/012,216 filed Dec. 7$^{th}$, 2007, the entire disclosure of which is hereby incorporated by reference, in its entirety.

TECHNICAL FIELD

The disclosed embodiments relate generally to the classification of time series data and other ordered data, and more particularly to the use of multi-scale time intervals to learn features with high discriminative value for classifying time series and other multi-dimensional data.

BACKGROUND OF THE INVENTION

Classifiers are statistical models, typically implemented as computer programs executed on computer systems, used to classify real world events based on a set of features of a real world event. A real world event is an instance of any entity or event in the real world. An instance of a person and an instance of a hockey game are both real world events. However, real world events can be works of imagination, such as book of fiction, a fake news story, an abstract painting, or a computer-generated digital image. Each of these events are still instances of their respective types.

Videos are one type of real world event that can be classified based on a set of features. Videos have various features, which can be based on attributes or elements of the video. An attribute is a numerical or qualitative aspect of an event, for example, a digital image can have attributes such as an average pitch, an average luminance, a texture parameter, or the like. An element refers to a sub-part of an event. Elements of a video could include a frame, a sequence of frames or a sound bite.

In classification, statistical models are generated which reflect the probability that an event belongs to a labeled class of events based on its set of features. Events may be labeled according to any system which creates distinct classes of events that can be characterized by a set of features. For video events, classes can be based on the type of event depicted within the video, a person in one or more frames of the video, the genre of the video or style of the video. The statistical models generated in classification identify and apply the features with the strongest discriminative value in the differential determination of classes of events. The discriminative value of a feature is a function of a feature's association with a class and the ability to discriminate members of the class based on the feature.

Features used in video classification are time series features, meaning they are generated and evaluated over a series of time points either sampled from the video or determined continuously for the video. The manipulation and comparison of time series feature data creates several challenges in the classification of videos and other time series events. One problem associated with the representation of features over a series of time points is that features which have strong discriminative value for a class can be found at multiple different time scales of a video or other times-series event. For instance, some features with a strong discriminative value may occur for only a small time interval or scale (e.g. at the millisecond scale) and other features with strong discriminative value may occur over a larger time interval or scale (e.g. at a scale of minutes or the entire duration of time series event). For instance, a maximum value over a small interval of time (e.g. a high sound pitch caused by a scream in a horror movie) may have equal discriminatory value as an average feature value taken over several minutes of a video (e.g. the number of different shots in a video showing a sporting event).

The order of the time series values over time creates additional problems in time series classification. Time series features are typically represented as an ordered vector of values corresponding to features over time or space. While order is important in determining time series features, often features with high discriminatory value for a label can occur in different portions of the video. For instance, adult content is often spliced into other videos at different time points making it more difficult to detect using time series features that are bound to a temporal model.

Other problems in classifying time series events based on time series features are caused by periodicity and sparseness of time series features. Certain features may have discriminative value based on their periodicity or recurrence over semi-regular time intervals. For instance, music videos often include the sound of applause on an audio soundtrack, which thus acts as a recurrent and periodic event that can be used to discriminate these types of videos from other types of videos. Other time series features may be sparse, meaning that the occurrence of the time series feature is sporadic over the video or other time series event and/or occurs over a brief interval of time.

SUMMARY

The described embodiments provide a method, system and computer program product that generate a statistical classification model used by computer systems to determine a class associated with an unlabeled time series event.

One aspect provides a method of generating a statistical classification model used by a computer system to determine a class associated with an unlabeled time series event. Initially, a set of labeled time series events is received, each time series event labeled with a class label. A set of time series features is identified for a selected set of the labeled time series events. A plurality of time intervals associated a first time series feature is identified for each time series event. A plurality of multi-scale features is generated for each time series event based on the plurality of time intervals. A first subset of the plurality of multi-scale features that corresponds to a subset of space or time points within a time series event that contain feature data that distinguish the time series event as belonging to a class of time series events that corresponds to the class label is identified for each of at least some time series events. A statistical classification model is generated for classifying an unlabeled time series event based on the at the first subset of the plurality of multi-scale features generated for the at least some time series events. The statistical classification model is stored in a computer-readable storage medium.

In another aspect, the described embodiments provide a computer system for generating a statistical classification model used by a computer system to determine a class associated with an unlabeled time series event. The system comprises a database for storing a set of labeled time series events, wherein each time series event is labeled with a class label. The system further comprises a time series feature generation module that is adapted to identify, for each of the set of labeled time series events, a set of time series features. The system further comprises a multi-scale feature generation module adapted to identify, for each time series event, a plurality of time intervals associated with at least a first time series feature, and generate, for each time series event, a second plurality of multi-scale features based on the plurality of time intervals. The system further comprises a classifier construction engine adapted to generate a statistical classification model for classifying an unlabeled time series event based on the class corresponding with the class label, based on the first subset of the plurality of multi-scale features generated for the at least some time series events of the set of labeled time series events and store the statistical classification model in a computer-readable storage medium.

Another aspect is embodied as a computer-readable storage medium on which is encoded computer program code for generating a statistical classification model used by a computer system to determine a class associated with an unlabeled time series event according to the above described method.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 2a illustrates the storage of Time Series Feature Data 211 generated from unlabelled time series event data in a Time Series Event Database 111 according to one embodiment.

FIG. 2b illustrates the storage of Time Series Feature Data 211 generated from labeled time series events in the Time Series Event Corpus Database 121 according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE DRAWINGS

Figure 1:
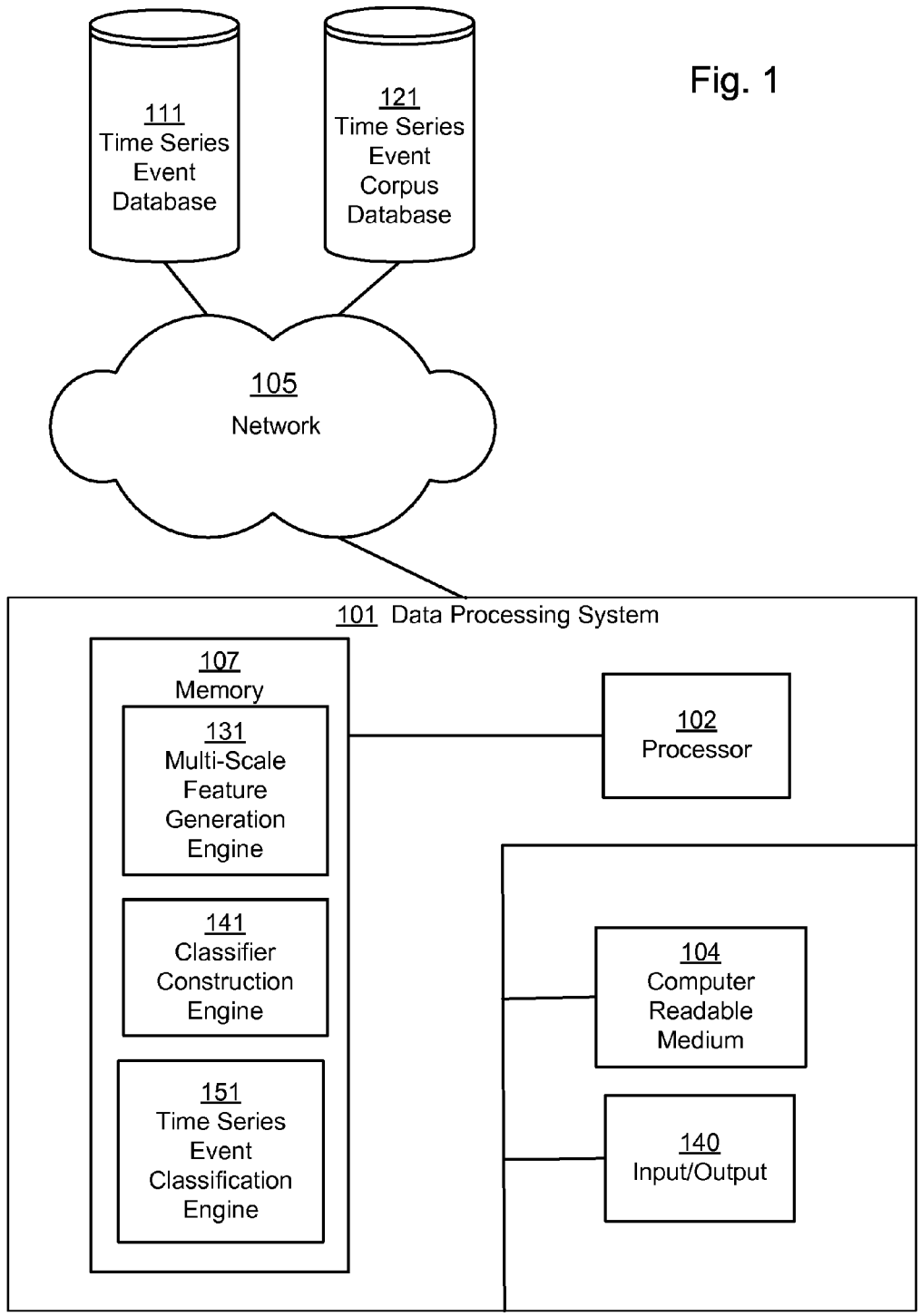
FIG. 1 shows a system architecture for a classification system.

FIG. 1 shows a system environment adapted to support one embodiment of a data processing system 101. FIG. 1 shows components used to generate multi-scale features, generate time series events classifiers and classify time series events. The system environment includes a Network 105, through which a Time Series Event Database 111, and Time Series Event Corpus Database 121 are accessed by a data processing system 101. The Time Series Event Database 111 stores unlabelled time series events. The Time Series Event Corpus Database 121 stores time series events that have been labeled according to a set of classes. For purposes of clarity, the Time Series Event Corpus Database 121 and the Time Series Event Database 111 are discussed herein as single databases. In some embodiments, both the Time Series Event Database 111 and the Time Series Event Corpus Database 121 can be comprised of multiple separate databases.

FIG. 1 shows component engines used to generate and apply classifiers to time series event data. The data processing system 101 includes a Multi-Scale Feature Generation Engine 131, Classifier Construction Engine 141 and a Time Series Event Classification Engine 151. Each of the foregoing are implemented, in one embodiment, as software modules (or programs) stored in memory and executed by a processor 102.

FIG. 1 shows that the data processing system 101 includes a memory 107 and one or more processors 102. The memory 107 includes the Multi-Scale Feature Generation Engine 131, Time Series Event Classification Engine 151 and the Classifier Construction Engine 141 each of which is preferably implemented as instructions stored in memory 107 and executable by the processor 102.

FIG. 1 also includes a computer readable storage medium 104 for storing, for example, at least one of the Time Series Event Classification Engine 151 and the Classifier Construction Engine 141. FIG. 1 also includes one or more input/output devices 140 that allow data to be input and output to and from the data processing system 101. It will be understood that embodiments of the data processing system 101 also include standard software and hardware components such as operating systems and the like and further include standard hardware components (e.g. network interfaces, storage devices, etc.) not shown in the figure for clarity of example.

The Multi-Scale Feature Generation Engine 131 operates to generate time series features from time series events and store the time series features. The Multi-Scale Feature Generation Engine 131 further operates to generate multi-scale features from the stored time series features.

The Classifier Construction Engine 141 operates to select training sets of multi-scale feature data associated with labeled time series event data from the Time Series Event Corpus Database 121, and generate classifiers based on the selected training sets. The Classifier Construction Engine 141 further operates to generate scores representative of the accuracy of a classification model by generating a plurality of classifiers according to the classification model. The Classifier Construction Engine 141 is adapted to communicate with Time Series Event Corpus Database 121 through the network 105.

The Time Series Event Classification Engine 151 operates to classify time series event data. The Time Series Event Classification Engine 151 is adapted to communicate with the Classifier Construction Engine to 141 receive classifiers. The Time Series Event Classification Engine 151 is also adapted to communicate with the Time Series Event Database 111 and the Time Series Event Corpus Database 121.

According to the embodiment of the present invention, the Classifier Construction Engine 141 and the Time Series Event Classification Engine 151 can operate on the unlabeled and labeled time series event data in the Time Series Event Corpus Database 121 and the Time Series Event Database 111 in different orders than described above.

It should also be appreciated that in practice at least some of the components of the data processing system 101 will be distributed over multiple computers, communicating over a network. For example, either or both of the Time Series Event Classifier Engine 151 and the Classifier Construction Engine 141 may be deployed over multiple computer servers. For convenience of explanation, however, the components of the data processing system 101 are discussed as though they were implemented on a single computer.

In another embodiment, some or all of the Time Series Event Corpus Database 121 and the Time Series Event Databases 111 are located on the data processing system 101 instead of being coupled to the data processing system 101 by a network 105. For example, the Time Series Event Classifier Engine 151 may classify time series events from the Time Series Event Database 111 that are a part of or associated with the data processing system 101.

Figures 2A, 2B:
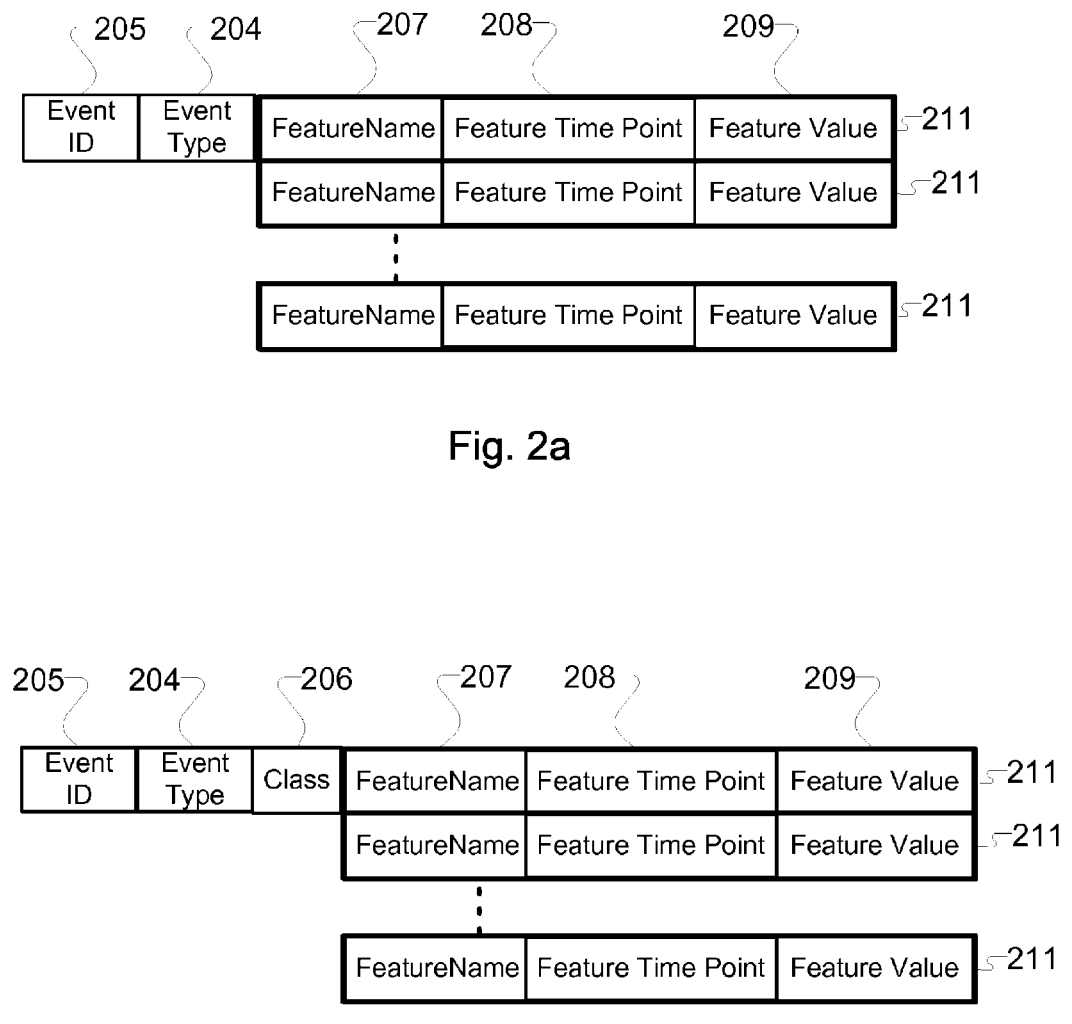

FIG. 2a illustrates the storage of time series video data in the Time Series Event Database 111 according to one embodiment. Time series events are represented using Event IDs 205 and stored as tuples in the Time Series Event Database 111. A tuple comprises an Event ID 205, an Event Type 204 and one or more sets of Time Series Features 211. Each Time Series Feature 211 includes a Feature Name 207, a Feature Value 209 and a Feature Time Point 208.

The Event ID 205 can be any kind of unique identifier that uniquely identifies (e.g., as a primary key in the Time Series Event Database 111) a time series event such as a random alphanumeric string, bit string, or the like, or a combination of data associated with the time series event such as the name of the event, or other information specific to the time series event.

The Event Type 204 is used to indicate the type of data associated with the time series event. Time series event refers to any event that occurs over a set of points in time and/or space. Therefore, time series events can include events that occur over time such as audio events or video events, as well as events that occur over space such as sequential or spatial data found in images, in real world physical locations, materials or compositions, in biological sequences, and so forth. Corresponding Event Types 204 can include but are not limited to: video data, audio data, pixel vector data, protein sequence data, global positioning system (GPS) data, biometric data etc. The Event Type 204 is used as an indicator to identify a group of time series events in the Time Series Event Corpus Database 121 for classifier construction. The Event Type 204 is also used to identify a group of time series events in the Time Series Event Database 111 for classification.

Time Series Features 211 are sets of features that are calculated or extracted at different time points in the video (or other underlying data) to represent or describe time series events as a set of values over time. Each Time Series Feature 211 represents a qualitative attribute or quantitative attribute of the time series event taken at a time point or interval within the time series event. The set of Time Series Features 211 for a time series event are based on the Event Type 204 of the time series event. For time series events which are videos, each Time Series Feature 211 may represent an element of a video at frames taken from different time points or time intervals within a video. Information from individual frames or shots may are processed to generate features representing visual aspects of each frame or shot such as color histograms, motion vectors and/or the audio aspects such as the MelFrequency Cepstral Coefficient (MFCC) features.

The Feature Name 207 is a unique identifier used to denote the equation or value that is captured in the Feature Value 208. The Feature Name 207 may store a set of strings corresponding to the names of the different features such as luminosity, percentage of grey pixels, pitch, number of shots detected, etc. The Feature Name 207 may also be represented as any categorical variable or as a set of unique integers used to represent the features.

Each Feature Name 207 in the Time Series Feature 211 corresponds with a Feature Value 209. A Feature Value 209 is the value calculated using the feature denoted by the Feature Name 207. According to the type of Time Series Feature 211, the Feature Value 209 may be categorical, textual or numeric.

The Feature Name 207 and Feature Value 209 are associated with a Feature Time Point 208. The Feature Time Point 208 denotes a time point or multiple time points specifying a time point or interval in the time series event from which the Feature Value 209 is calculated. Feature Time Points 208 can be represented using a variety of methods such as a number of seconds into the time series event, a percentage value a portion of time elapsed, or values specifying the start or stop points of the time series event. For time series events which occur over space the Feature Time Points 208 may be represented as spatial co-ordinates, integers representing ordered positions, etc. The time interval for a Time Series Feature 211 corresponds to a space or time interval from the time series event. For video time series events, a time interval may be correspond to a fraction of a second or small number of frames of the video, a shot within the video or the entire duration of the video.

FIG. 2b illustrates the storage of Time Series Features 211 in the Time Series Event Corpus Database 121. Each time series event is represented by a tuple in a Time Series Event Corpus Database 121. A tuple comprises an Event ID 205, a Class 206 and one or more sets of Time Series Features 211. Each Time Series Feature includes a Feature Name 207, a Feature Value 209 and a Feature Time Point 208.

A Class 206 is used to represent a class or category of time series event. A class is any group of real world events having shared characteristics such as features. A category is a type of class that marks a natural division between different types of things. Time series events in the Time Series Event Corpus Database 121 are assigned one or more Class 206 fields. Class 206 fields may be assigned manually or assigned computationally. Manual curation of a corpus refers to the assignment of classes or categories to events based on human discretion. Computational assignment of classes to time series events refers to the use of machine learning approaches to generate classification values indicative that a time series event belongs to a Class 206. In one embodiment, the Class 206 field is assigned by the Time Series Event Classification Engine 151.

Figure 3A:
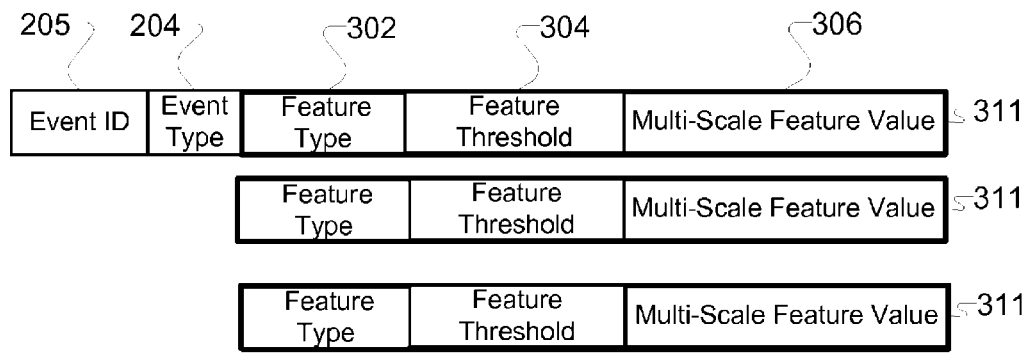
FIG. 3a illustrates the storage of Multi-Scale Feature Data 311 generated from time series events in the Time Series Event Database 111 according to one embodiment.

FIG. 3a illustrates the storage of Multi-scale Features 311 in a Time Series Event Database 111 according to one embodiment. Each time series event is represented using an Event ID 205 and stored with a series of Multi-Scale Feature 311 represented as tuples. Multi-Scale Features 311 are generated from the Time Series Features 211. Here, a tuple consists of a Feature Type 302, Feature Threshold 304, and a set of Multi-Scale Feature Values 306. In some embodiments, each Multi-Scale Feature 311 will reference the set of Time Series Features 211 used to generate the Multi-Scale Feature 311.

The Feature Type 302 of the Multi-Scale Feature 311 indicates the type of feature that is extracted in Multi-Scale Feature generation. Suitable Feature Types 302 include duration, average duration, average feature value, maximum and minimum feature values, derivative based values, rank, percentile values, statistical measures, and any combination thereof. Feature Type 302 may be represented by any kind of unique value for each Feature Type 302, such as a string or an integer. Other values will be apparent to those skilled in the art. The Multi-Scale Feature Value 306 is the field used to store the value of the Multi-Scale Feature corresponding to the Feature Type 302 and the Feature Threshold 304.

The Feature Threshold 304 refers to a threshold used to generate each Multi-Scale Feature 311. The Feature Threshold 304 may be denoted using numerical variables or categorical variables or any combination thereof.

Figure 3B:
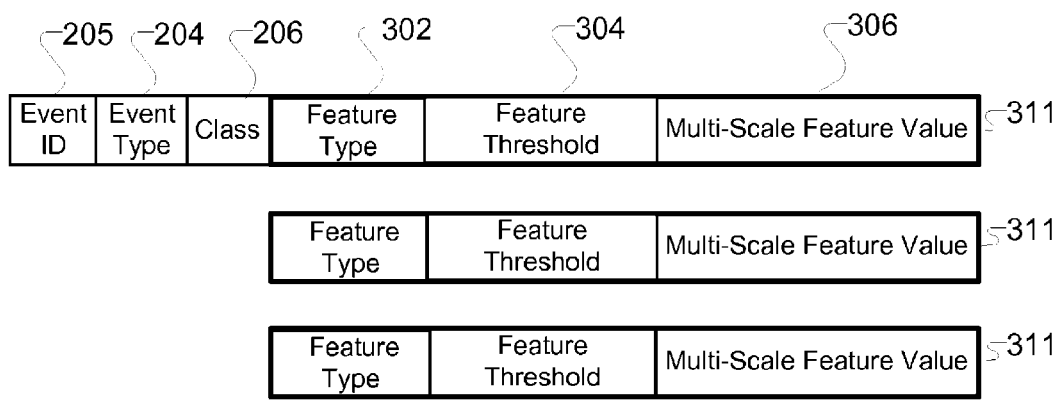
FIG. 3b illustrates the storage of Multi-Scale Feature Data 311 generated from labeled time series events in a Time Series Event Corpus Database 121 according to one embodiment.

FIG. 3b illustrates the storage of Multi-Scale Features 311 in the Time Series Event Corpus Database 121 according to one embodiment. Each time series event is represented using an Event ID 205 and stored with a series of Multi-Scale Features 311 and the Class 206 associated with the time series event.

Figure 4:
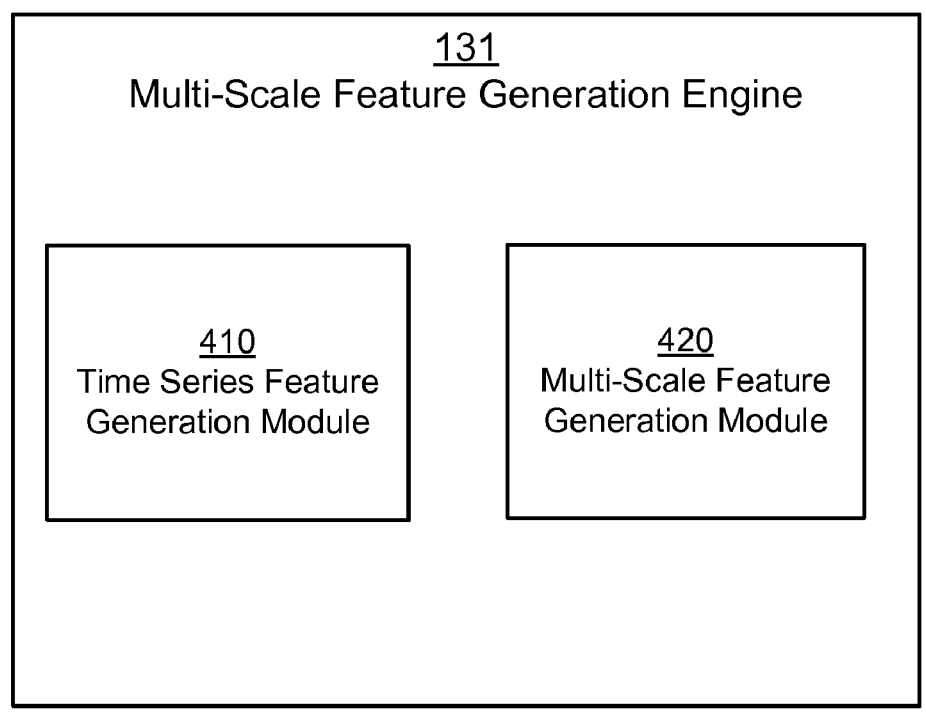
FIG. 4 illustrates one embodiment of a Multi-Scale Feature Generation Engine 300.

FIG. 4 illustrates one embodiment of a Multi-Scale Feature Generation Engine 131. The Multi-Scale Feature Generation Engine 131 is comprised of two modules: a Time Series Feature Generation Module 410 and a Multi-Scale Feature Generation Module 420.

The Time Series Feature Generation Module 410 generates Time Series Features 211 for time series events in the Time Series Event Database 111 and Time Series Event Corpus Database 121. The Time Series Feature Generation Module 410 calculates the Feature Value 209 of a Time Series Feature 211 at a specified set of Feature Time Points 208. The Time Series Feature Generation Module 410 further stores the Time Series Features 211 for the time series events in the Time Series Event Database 111 and the Time Series Event Corpus Database 121. In most embodiments, the Time Series Feature Generation Module 410 is run as a batch program when time series events are added to the Time Series Event Database 111 and Time Series Event Corpus Database 121.

The Multi-Scale Feature Generation Module 420 generates Multi-Scale Features 311 based on the Time Series Features 211 generated for a time series event. The Multi-Scale Feature Generation Module 420 generates sets of Multi-Scale Features 311 based on Feature Thresholds 304 identified for the Time Series Features 211.

Figure 5:
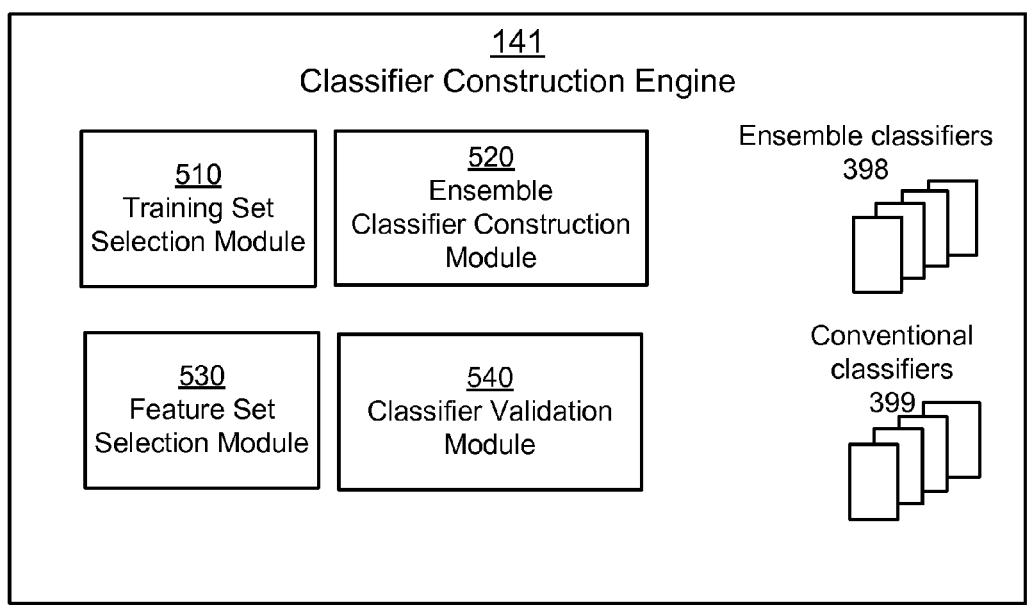
FIG. 5 illustrates one embodiment of a Classifier Construction Engine 400.

FIG. 5 illustrates one embodiment of a Classifier Construction Engine 141. The Classifier Construction Engine 141 is comprised of three modules, a Training Set Selection Module 510, a Feature Set Selection Module 530, an Ensemble Classifier Construction Module 520 and a Classifier Validation Module 540.

The Training Set Selection Module 510 selects subsets of time series events associated with a Class 259 of time series events as training data for classifier construction. The Training Set Selection Module 310 is adapted to receive Classes 259 of time series events as input. The Training Set Selection Module 510 is adapted to communicate with one or more Time Series Event Corpus Databases 121 to select training sets comprised of time series events of the received classes of time series events. The Training Set Selection Module 510 is also adapted to receive sets of features associated with time series events from the Feature Set Selection Module 360. The Training Set Selection Module 510 uses graph based sampling to select sets of time series events associated with a class of time series events as training data. Graph based sampling is described in detail in application Ser. No. 11/840,319, "Graph Based Sampling" filed on Aug. 16, 2007, the disclosure of which is incorporated herein by reference.

The Feature Set Selection Module 530 selects subsets of features associated with a selected set of time series events for use as training data for classifier construction. The Feature Set Selection Module 530 is adapted to communicate with one or more Time Series Event Corpus Databases 121 to select subsets of features associated with a selected set of time series events. The Feature Set Selection Module 530receives a set of selected time series events as input. Alternatively, the Feature Set Selection Module 530 is adapted to receive a selected set of time series events from the Training Set Selection Module 510. The Feature Set Selection Module 530 selects subsets of features associated with the set of time series events such as training data using graph based sampling.

The Ensemble Classifier Construction Module 520 generates Ensemble or consensus classifiers 398 based on selected training sets of time series data. Ensemble or consensus classifiers refer to computer-implemented classification models which generate a plurality of statistical classification models and combine the predictions of the plurality of statistical classification models. The Ensemble Classifier Construction Module 520 generates Ensemble classifiers 398 according to any consensus classification algorithm including Boosting and Bagging algorithms. Other applications of consensus classification using other classifier algorithms will be apparent to those skilled in the art. The Ensemble classifiers 398 are stored as computer readable files.

The Classifier Validation Module 540 generates conventional or single classifiers 399 based on a conventional or single classification model or algorithm as opposed to Ensemble methods. According to one embodiment, the Classifier Validation Module 540 generates a conventional classifier 399 based on a single training set of time series data. In other embodiments, the Classifier Validation Module 540 generates a plurality of conventional classifiers 399 based on a plurality of training sets to validate the classification model or algorithm. The conventional classifiers 399 are typically stored as computer readable files.

In one embodiment, the Classifier Validation Module 540 is adapted to receive sets of training data from the Training Set Selection Module 510. The Classifier Validation Module 540generates a plurality of classifiers using any probabilistic or regression based classification algorithm including support vector machines (SVMs), neural networks, and Bayesian approaches. Other classification algorithms will be apparent to those skilled in the art. According to the embodiment, the Classifier Validation Module 540generates multi-class classifiers or binary classifiers.

The Classifier Validation Module 540further generates scores representative of the accuracy of the classification model by determining a plurality of accuracy values. The Classifier Validation Module 540 is adapted to receive test sets of time series event data associated with classes of time series events from the Time Series Event Corpus Database 121. The Classifier Validation Module 540 generates accuracy scores based on the classification results generated from the application of classifiers to test sets of time series data. Test time series data sets are data sets with known classes of time series data used to evaluate the accuracy of classifier prediction. The classifiers are applied to the test time series data sets to generate metrics or classification results. Classification results include the number of false positive classifications of test set time series data, the number of false negative classifications of test set data, the percentage or accurate classifications or any other quantitative classification result representative of the accuracy of the classifier.

Figure 6:
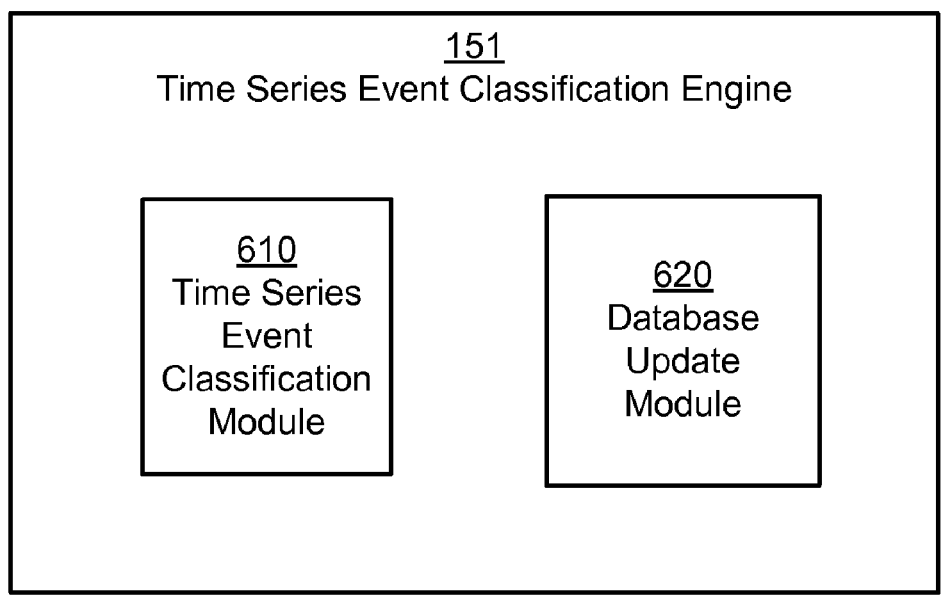
FIG. 6 illustrates one embodiment of a Time Series Event Classification Engine 500.

FIG. 6 illustrates one embodiment of a Time Series Event Classification Engine 151. The Time Series Event Classification Engine 151 is comprised of two modules, a Time Series Event Classification Module 610 and a Database Update Module 620. The Time Series Event Classification Engine 151 is adapted to communicate with the Time Series Event Database 111 and the Time Series Event Corpus Database 121. The Time Series Event Classification Module 610 is further adapted to receive classifiers from the Classifier Construction Engine 141.

The Time Series Event Classification Module 610 operates to classify time series events. The Time Series Event Classification Module 610 identifies time series events in the Time Series Event Databases 111 for classification. In some embodiments, the type of classifiers 398, 399 and time series events to be classified by the Time Series Event Classification Module 610 are specified based on user input.

The Time Series Event Classification Module 610 generates classification values for series events by applying a classifier to the time series events. Classification values may be absolute values or probability values. In some embodiments, the Time Series Event Classification Module 610 assigns a Class 206 to time series events based on the classification value exceeding a threshold value.

The Database Update Module 620 operates to update the Time Series Event Corpus Database 121 based on the Class 206 assigned to time series events. In some embodiments, the Database Update Module 620 operates to updates the Time Series Event Corpus Databases 121 to add the time series event data with the assigned Class 206.

Figure 7:
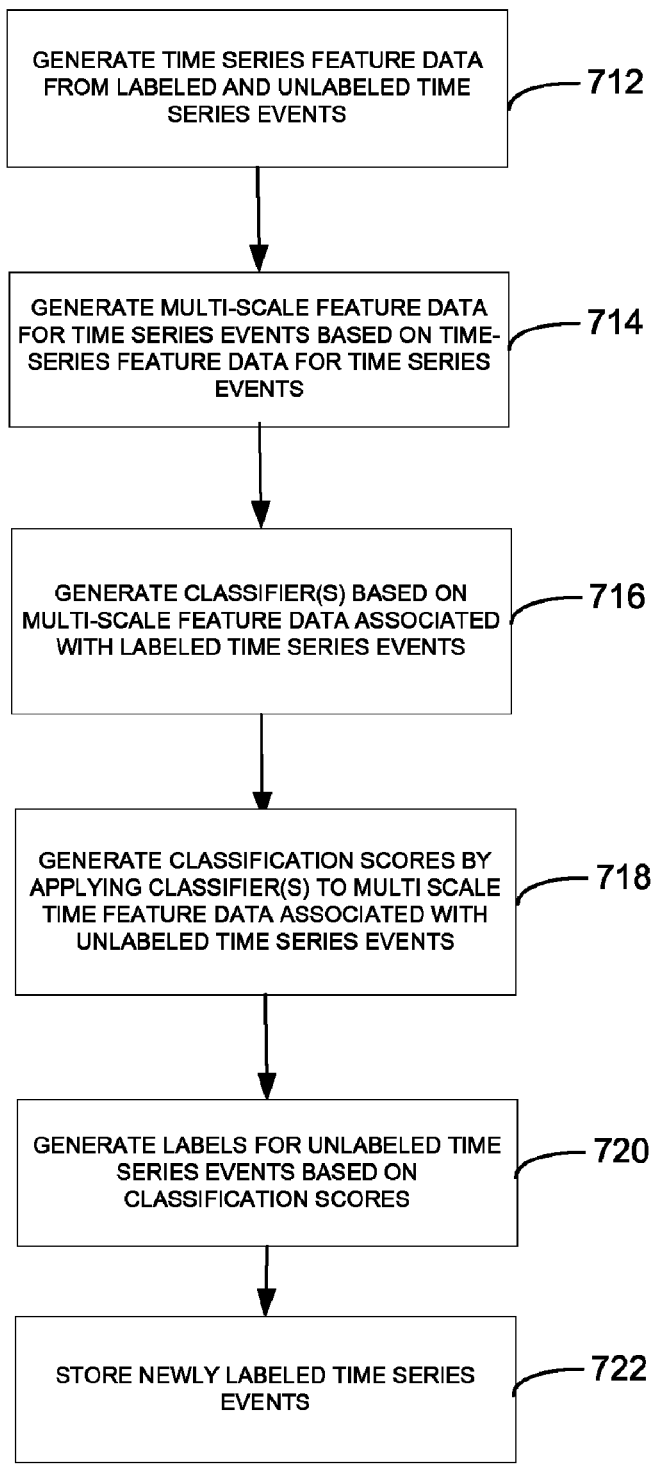
FIG. 7 illustrates a high level workflow for time series event classification according to one embodiment.

FIG. 7 is flowchart illustrating a more detailed view of steps performed in classifying a time series event according to one embodiment.

The Time Series Feature Generation Module 410 generates 712 a set of Time Series Features 211 for labeled and unlabelled time series events. The Time Series Feature Generation Module 410 stores the Time Series Features 211 generated for unlabeled and labeled time series events in the Time Series Event Database 111 and the Time Series Event Corpus Database 121, respectively. For each Times Series Feature 211, Feature Values 209 is generated 712 based on the Event Types 204 of the time series events.

For time series events with an Event Type 204 indicating audio data, the Feature Values 209 can include values for volume features, audio decomposition features and audio modeling features such as the MelFrequency Cepstral Coefficient (MFCC) features.

For time series events with an Event Type 204 indicating biological sequence data, the Feature Values 209 can include values for features such as the amino acid or nucleic acid composition of a given subsequence, a number of repeats of an amino acid or nucleotide in a given subsequence, a representation of n-mers within a given subsequence, etc.

For time series events with an Event Type 204 indicating video data, the Feature Values 209 can include any type of audio information as described above, features form motion models, features obtained using optical text recognition, image features such as color histograms, face recognition features, features generated using edge detection algorithms, features generated using shot detection algorithms and features derived from speech to text processing algorithms.

According to the embodiment, the Time Series Feature Generation Module 410 can generate 712 Time Series Features 211 at a set of Feature Time Points 208 which represent a continuous sampling of the time series event or a sampling from defined intervals throughout the time series event. The defined intervals can represent any time interval but typically will range from a millisecond to a several seconds.

The Multi-Scale Feature Generation Module 420 generates 714 a set of Multi-Scale Features 311 based on the set of Time Series Features 211. The Multi-Scale Feature Generation Module 420 can generate a multi-scale model using any type of transformation of the Time Series Features 211 which divides or transforms a set of Time Series Features 211 representing Feature Values 209 for a given Feature Name 207 into several different scales or intervals over time and/or space. In a specific embodiment, the set of Multi-Scale Features 311 are generated 714 based on identifying intervals of time or space points of the Time Series Features 211 that are above or below a Feature Threshold 304, as discussed below.

The Classifier Construction Engine 141 generates 716 one or more classifiers based on the Multi Scale Features 311 and the Time Series Features 211 generated for time series events associated with a Class 206. The Training Set Selection Module 510 selects time series events associated with a Class 206. In a specific embodiment, the Training Set Selection Module 510 uses graph based sampling to select a subset of the Time series events associated with a Class 206. In some embodiments, the Feature Set Selection Module 530 uses graph based sampling to select a subset of the Multi Scale Features 311 and the Time Series Features 211 generated for time series events associated with a Class 206

The Classifier Construction Engine 141 either generates 716 Ensemble classifiers 398 or Conventional Classifiers 399 based on the selected features and selected time series events labeled with one or more Classes 206 as described above. In generating both Ensemble classifiers 398 and Conventional Classifiers 399, the Classifier Construction Engine 141 identifies Multi-Scale Features 311 that have a high discriminative value in identifying the Class 206 of a time series event. For time series events in which a subset of time or space points in the time series the event upon which the Class 206 will be based, the discriminative value of a Multi-Scale Feature 311 corresponds to the Feature Type 302 or Feature Threshold 304 of the Multi-Scale Feature 311. Suitable methods of generating and evaluating Ensemble classifiers 398 and Conventional Classifiers 399 are discussed in detail in the above referenced application "Graph Based Sampling".

The Time Series Event Classification Module 610 determines labels for time series events stored in the Time Series Event Database 111. The Time Series Event Classification Module 610 selects a set of unlabelled time series events from the Time Series Event Database 111 for classification based on the Event Type 204 of the Time Series Events. The Time Series Event Classification Module 610 applies an Ensemble classifier 398 or Conventional Classifier to the Time Series Features 211 and Multi-Scale Features 311 associated with the unlabelled time series event data to generate classification score(s) which indicate the likelihood that an unlabelled time series event is of one or more Classes 206 of time series events. The Time Series Event Classification Module 610 determines that a time series event is to be labeled with a Class 206 based on the classification score exceeding a specified likelihood value. For example, the Time Series Classification Module may determine a time series event is of a Class 206 based on a values indicating a likelihood that a time series event is of a specified Class 206 of 95% or greater.

The Database Update Module 620 stores the newly labeled time series event data in the Time Series Event Corpus Database 121. The Database Update Module 620 stores the Time Series Features 211 and the Multi-scale Features 311 for the time series events in association with the newly determined Class 206 of the time series event.

Figure 8A:
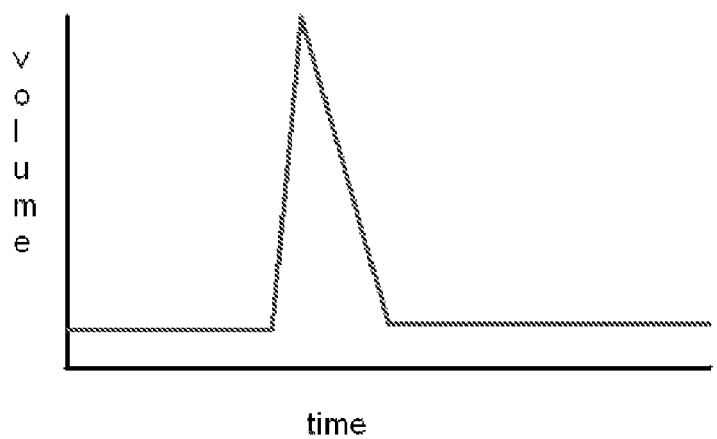
FIG. 8a illustrates a plot of feature values for time series feature associated with a time series event.

FIG. 8a provides an illustration of a simple time series feature for a time-series event. In this illustration, the feature "volume" is plotted over a series of time points in the time-series event. When plotted over time, the volume is shown to have a sharp localized increase, a characteristic that may provide discriminative value for the time series event. For instance, silence followed by a short interval with a sharp increase and decrease in volume could be specific to a genre of music or type of video. As this increase in volume is localized to a set time points within the time-series event, the average volume level over an entire duration of the time-series event would not provide discriminative value in constructing a classifier. Also illustrated are several threshold values associated with different volume levels. A small number of contiguous time points have a volume level above threshold 1, a larger number of contiguous time points have a volume level above threshold 2 and a large number of contiguous time points have a volume level above threshold 3.

Figure 8B:
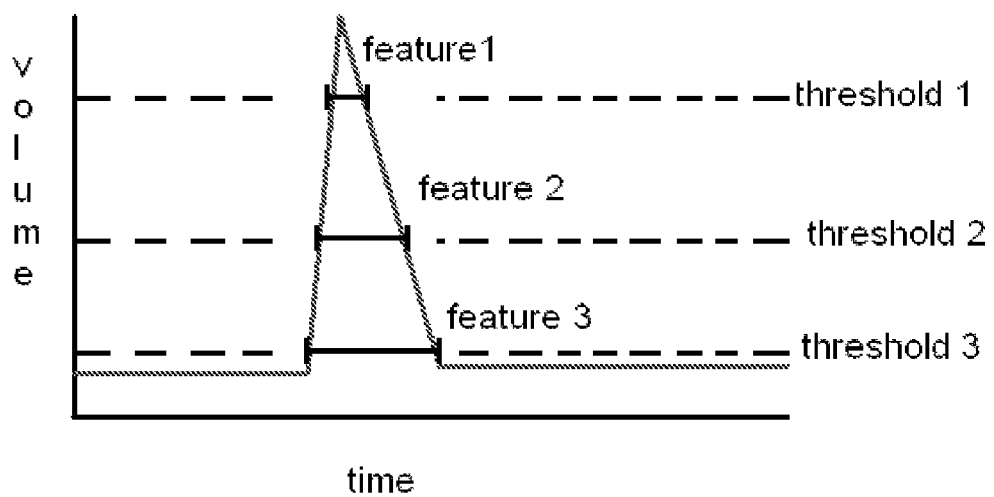
FIG. 8b illustrates the use of thresholds to identify corresponding time intervals at multiple scales of the time series feature associated with a time series event.

FIG. 8b illustrates the use of multiple thresholds to generate multi-scale time series features. Time intervals comprising a set of time points where the time-series feature is at or above each threshold are identified. Time interval 1 is identified in association with threshold 1, time interval 2 is identified in association with threshold 2 and time interval 3 is identified in association with threshold 3. Through identifying the time intervals associated with different thresholds, characteristics which may have discriminative value are captured at different time or space scales corresponding to the thresholds specified. In FIG. 8b the time intervals identified characterize the localized increase of the time-series feature.

Figure 9:
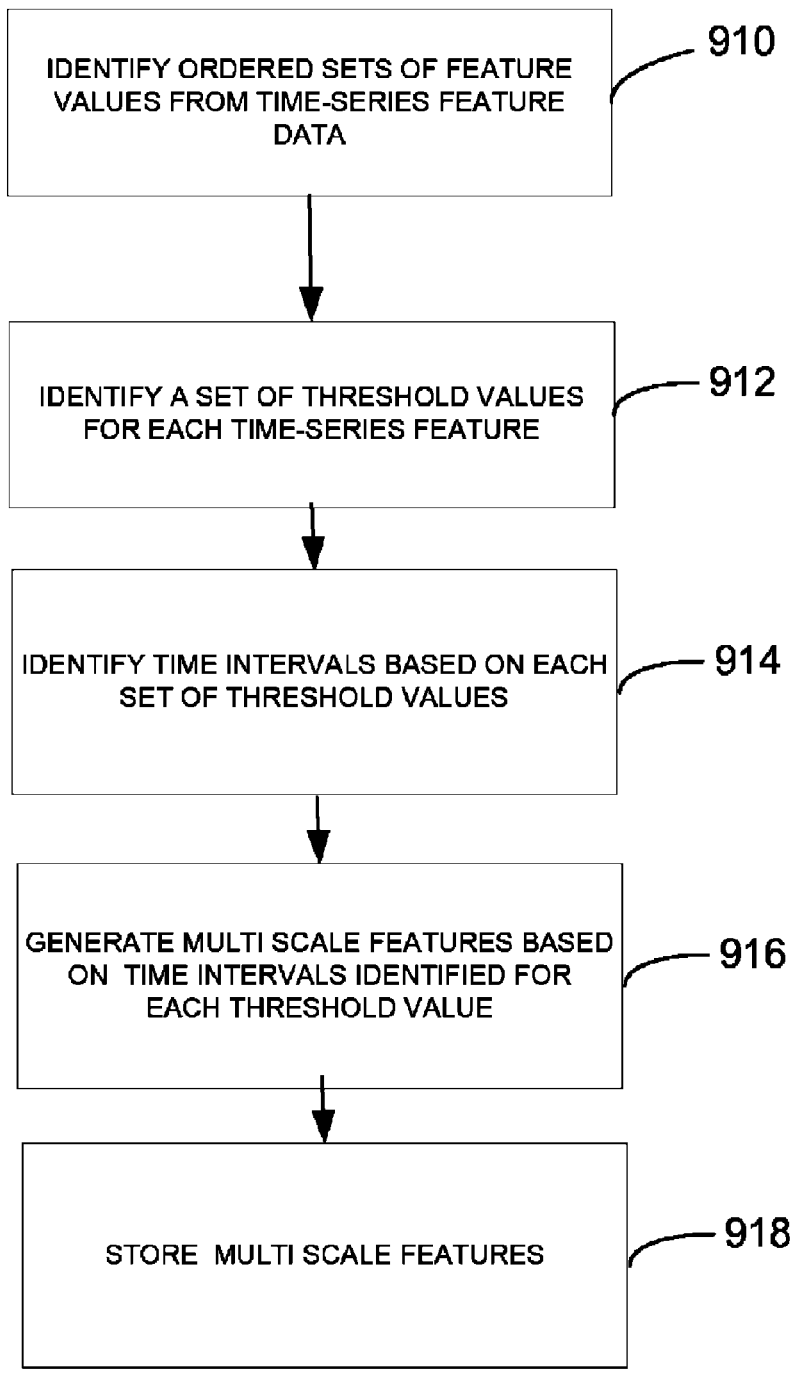
FIG. 9 illustrates a high level workflow for multi-scale feature generation according to one embodiment.

FIG. 9 is flowchart illustrating a more detailed view of steps performed in generating Multi-Scale Features 311 based on Time Series Features 211.

The Multi-Scale Feature Generation Module 420 identifies 910 a set of Time Series Features 211 of the same Feature Name 207 associated with time series event represented using an Event ID 205. The Multi-Scale Feature Generation Module 420 represents the Time Series Features 211 as an ordered set of values, wherein the order of the Feature Values 209 reflects the temporal or spatial order of the Feature Time Points 208.

The Multi-Scale Feature Generation Module 420 identifies 912 a set of Feature Threshold 304 values for each Time Series Feature 211. The set of Feature Threshold 304 values may be based on a defined set of threshold values for each Time Series Feature 211. The defined set of threshold values may be absolute values defined for Time Series Features 211 associated with a specific Feature Name 207. Alternatively, the set of threshold values may be based on percentile values (e.g. $10^{th}$ percentile, $20^{th}$ percentile, $50^{th}$ percentile, $95^{th}$ percentile) generated based on all Feature Values 209 associated with the Time Series Features 211. Percentile values may also be generated based on all Feature Values 209 associated with all Time Series Features 211 in the Time Series Event Database 111 and/or Time Series Event Corpus Database 121 associated with a Feature Name 207.

The Multi-Scale Feature Generation Module 420 identifies 914 one or more time intervals associated with each threshold value. In some embodiments, the Multi-Scale Feature Generation Module 420 identifies 914 only the longest time interval of continuous Feature Time Points 208 where each Feature Value 209 associated with the Feature Time Point 208 is above or below the threshold value. In other embodiments, the Multi-Scale Feature Generation Module identifies 914 all intervals of continuous Feature Time Points 208 where each Feature Value 209 associated with the Feature Time Point 208 is above or below the threshold value.

The Multi-Scale Feature Generation Module 420 generates 916 Multi-Scale Features 311 based on the identified time intervals corresponding to each Feature Threshold 304. Depending on the embodiment, the Multi-Scale Feature Generation Module 420 can generate 916 Multi-Scale Feature Values 306 based on a single time interval identified in association with a Feature Threshold 304 or multiple time intervals identified in association with a Feature Threshold 304. In different embodiments, different Multi-Scale Feature Values 306 can be generated for different Feature Types 302. Feature Types 302 can include: the maximum and minimum Feature Values 209 for a single or multiple time intervals, the duration of the longest time interval of the time intervals, the average or standard deviation Feature Values 209 of the single or multiple time intervals, or any derivate of the Feature Values 209 of the single or multiple time intervals. Other Feature Types 302 will be apparent to those skilled in the art.

The Multi-Scale Feature Generation Module 420 stores 918 each Multi-Scale Feature Values 306 in association with its Feature Type 302 and Feature Threshold 304 as a Multi-Scale Feature 311 in the Time Series Event Database 111 or Time Series Event Corpus Database 121.

The present invention has been described in particular detail with respect to various possible embodiments, and those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer-implemented method of generating a statistical classification model used by a computer system to determine a class associated with an unlabeled time series event, the method comprising:
   receiving a set of labeled time series events, wherein each time series event is labeled with a class label;
   identifying, for each time series event of the set of labeled time series events, a set of time series features, wherein each time series feature represents a feature for at least one time point of a time series event;
   identifying, for each time series event of the set of labeled time series events, a plurality of time intervals associated with at least a first time series feature of the set of time series features, wherein each time interval includes a plurality of time points associated with feature values above a specified threshold of a plurality of specified thresholds associated with the at least a first time series feature;
   generating, for each time series event of the set of labeled time series events, a plurality of multi-scale features based on the plurality of time intervals;
   identifying, for each of at least some time series events of the set of labeled time series events, a first subset of the plurality of multi-scale features that correspond at least in part to a subset of space or time points within a time series event that contain feature data that distinguish the time series event as belonging to a class of time series events that corresponds to the class label;
   generating a statistical classification model for classifying an unlabeled time series event based on the class corresponding with the class label, based at least in part on the at the first subset of the plurality of multi-scale features generated for the at least some time series events of the set of labeled time series events; and
   storing the statistical classification model in a computer-readable storage medium.

2. The method of claim 1, further comprising:
   receiving a set of unlabelled time series events;
   identifying, for each time series event of the set of unlabelled time series events, a set of time series features;
   identifying, for each time series event of the set of unlabelled time series events, a second plurality of time intervals associated with at least a first time series feature of the set of time series features;
   generating, for each time series event of the set of unlabelled time series events, a second plurality of multi-scale features based on the plurality of time intervals;
   identifying, for at least some of the time series events, a second subset of the second plurality of multi-scale features that correspond at least in part to a set of space or time points within the time series event that contain feature data that distinguish the times series events as belonging to a class of time series events that corresponds to the class label; and
   generating, for each of the set of unlabelled time series events, a classification value based in part on applying the statistical classification model to the second subset of the second plurality of multi-scale features, wherein the classification value indicates a likelihood that the unlabelled time series event belongs to the class of time series events that corresponds to the class label.

3. The method of claim 1, wherein generating a plurality of multi-scale features based on the plurality of time intervals comprises identifying a plurality of values representing the number of time points included in each of the plurality of time intervals.

4. The method of claim 1, wherein generating a plurality of multi-scale features based on the plurality of time intervals comprises identifying a plurality of multi-scale feature values based on the feature values associated with the plurality of time points included in the plurality of time intervals.

5. The method of claim 4, wherein the plurality of multi-scale feature values are the average of the feature values associated with the plurality of time points included in the plurality of time intervals.

6. The method of claim 4, wherein the plurality of multi-scale feature values are the maximum value of the feature values associated with the plurality of time points included in the plurality of time intervals.

7. The method of claim 4, wherein the plurality of multi-scale feature values are the maximum value of the feature values associated with the plurality of time points included in the plurality of time intervals.

8. The method of claim 1, wherein at least some of the plurality of specified thresholds are absolute values.

9. The method of claim 1, wherein at least some of the plurality of specified thresholds represent percentile values based on a set of feature values associated with at least a first time series feature.

10. The method of claim 1, wherein the time series event is a video.

11. The method of claim 1, wherein the time series event is one of: a biological sequence, a set of biometric data, global positioning system data, audio data and image data.

12. A computer-readable storage medium encoded with program code for generating a statistical classification model used by a computer system to determine a class associated with an unlabeled time series event, the program code comprising:
  program code for receiving a set of labeled time series events, wherein each time series event is labeled with a class label;
  program code for identifying, for each time series event of the set of labeled time series events, a set of time series features, wherein each time series feature represents a feature for at least one time point of a time series event;
  program code for identifying, for each time series event of the set of labeled time series events, a plurality of time intervals associated with at least a first time series feature of the set of time series features, wherein each time interval includes a plurality of time points associated with feature values above a specified threshold of a plurality of specified thresholds associated with the at least a first time series feature;
  program code for generating, for each time series event of the set of labeled time series events, a plurality of multi-scale features based on the plurality of time intervals;
  program code for identifying, for each of at least some time series events of the set of labeled time series events, a first subset of the plurality of multi-scale features that correspond at least in part to a subset of space or time points within a time series event that contain feature data that distinguish the time series event as belonging to a class of time series events that corresponds to the class label;
  program code for generating a statistical classification model for classifying an unlabeled time series event based on the class corresponding with the class label, based at least in part on the at the first subset of the plurality of multi-scale features generated for the at least some time series events of the set of labeled time series events; and
  program code for storing the statistical classification model in a computer-readable storage medium.

13. The medium of claim 12, further comprising:
  program code for receiving a set of unlabelled time series events;
  program code for identifying, for each time series event of the set of unlabelled time series events, a set of time series features;
  program code for identifying, for each time series event of the set of unlabelled time series events, a second plurality of time intervals associated with at least a first time series feature of the set of time series features;
  program code for generating, for each time series event of the set of unlabelled time series events, a second plurality of multi-scale features based on the plurality of time intervals;
  program code for identifying, for at least some of the time series events, a second subset of the second plurality of multi-scale features that correspond at least in part to a set of space or time points within the time series event that contain feature data that distinguish the times series events as belonging to a class of time series events that corresponds to the class label; and
  program code for generating, for each of the set of unlabelled time series events, a classification value based in part on applying the statistical classification model to the second subset of the second plurality of multi-scale features, wherein the classification value indicates a likelihood that the unlabelled time series event belongs to the class of time series events that corresponds to the class label.

14. The medium of claim 12, wherein program code for generating a plurality of multi-scale features based on the plurality of time intervals comprises program code for identifying a plurality of values representing the number of time points included in each of the plurality of time intervals.

15. The medium of claim 12, wherein program code for generating a plurality of multi-scale features based on the plurality of time intervals comprises program code for identifying a plurality of multi-scale feature values based on the feature values associated with the plurality of time points included in the plurality of time intervals.

16. The medium of claim 15, wherein the plurality of multi-scale feature values are the average of the feature values associated with the plurality of time points included in the plurality of time intervals.

17. The medium of claim 15, wherein the plurality of multi-scale feature values are the maximum value of the feature values associated with the plurality of time points included in the plurality of time intervals.

18. The medium of claim 15, wherein the plurality of multi-scale feature values are the maximum value of the feature values associated with the plurality of time points included in the plurality of time intervals.

19. The medium of claim 12, wherein at least some of the plurality of specified thresholds are absolute values.

20. The medium of claim 12, wherein at least some of the plurality of specified thresholds represent percentile values based on a set of feature values associated with at least a first time series feature.

21. The medium of claim 12, wherein the time series event is a video.

22. The medium of claim 12, wherein the time series event is one of: a biological sequence, a set of biometric data, global positioning system data, audio data and image data.

23. A computer-implemented system, for generating a statistical classification model used by a computer system to determine a class associated with an unlabeled time series event, the system comprising:
  a database for storing a set of labeled time series events, wherein each time series event is labeled with a class label;
  a time series feature generation module adapted to identify, for each time series event of a set of labeled time series events, a set of time series features, wherein each time series feature represents a feature for at least one time point of the time series events;
  a multi-scale feature generation module adapted to:
    identify, for each time series event of the set of labeled time series events, a plurality of time intervals associated with at least a first time series feature of the set of time series features, wherein each time interval includes a plurality of time points associated with feature values above a specified threshold of a plurality of specified thresholds associated with the at least a first time series feature; and generate, for each time series event of the set of unlabelled time series events, a second plurality of multi-scale features based on the plurality of time intervals; and a classifier construction engine adapted to:
generate a statistical classification model for classifying an unlabeled time series event based on the class corresponding with the class label, based at least in part on the at the first subset of the plurality of multi-scale features generated for the at least some time series events of the set of labeled time series events; and store the statistical classification model in a computer-readable storage medium.

24. The system of claim 23, wherein:
the database is further adapted to store a set of unlabelled time series events;
the time series feature generation module is further adapted to identify, for at least some of the unlabelled time series events, a set of time series features;
the multi space feature generation module is further adapted to:
identify, for each time series event of the set of unlabelled time series events, a second plurality of time intervals associated with at least a first time series feature of the set of time series features;
generate, for each time series event of the set of unlabelled time series events, a second plurality of multi-scale features based on the plurality of time intervals; and further comprising a time series event classification module adapted to:
identifying, for at least some of the time series events, a second subset of the second plurality of multi-scale features that correspond at least in part to a set of space or time points within the time series event that contain feature data that distinguish the times series events as belonging to a class of time series events that corresponds to the class label; and generate, for at least some of the unlabelled time series events, a classification value based on the statistical classification model and the second subset of multi-scale features, wherein each classification value indicates the likelihood that a video of the second set of time series events is of the class of time series events.

* * * * *